US010246897B2

(12) United States Patent
Chen (10) Patent No.: US 10,246,897 B2
(45) Date of Patent: Apr. 2, 2019

(54) JOINT STRUCTURE (71) Applicant: SPORTSMAN CORPORATION, New Taipei (TW)

(72) Inventor: Jack Chen, New Taipei (TW)

(73) Assignee: SPORTSMAN CORPORATION, New Taipei (TW)

( * ) Notice: Subject to any disclaimer, the term of this patent is extended or adjusted under 35 U.S.C. 154(b) by 265 days.

(21) Appl. No.: 15/343,400

(22) Filed: Nov. 4, 2016

(65) Prior Publication Data

US 2018/0030752 A1    Feb. 1, 2018

(30) Foreign Application Priority Data

Jul. 26, 2016   (TW) .............................. 105123642 A (51) Int. Cl.
*F16C 11/00* (2006.01)
*E04H 15/48* (2006.01)
(Continued)

(52) U.S. Cl.
CPC ............. *E04H 15/48* (2013.01); *E04H 15/60* (2013.01); *F16C 11/10* (2013.01); *Y10T 403/32336* (2015.01)

(58) Field of Classification Search
CPC ..... Y10T 403/32262; Y10T 403/32319; Y10T 403/32327; Y10T 403/32336; Y10T 403/32344; Y10T 403/32352; Y10T 403/32361; Y10T 403/32377; Y10T 403/32385; Y10T 403/32393;
(Continued)

(56) References Cited

U.S. PATENT DOCUMENTS 5,111,548 A * 5/1992 Ohshima .................. E05F 3/14
16/51
5,123,768 A * 6/1992 Franklin .............. A46B 5/0075
403/84
(Continued)

FOREIGN PATENT DOCUMENTS

AU    2009225280 A1    4/2011
TW    570087    1/2004

OTHER PUBLICATIONS

Examination Report of Australia Intellectual.
Extended Examination Report of European Patent Office.

*Primary Examiner* — Amber R Anderson
*Assistant Examiner* — Nahid Amiri
(74) *Attorney, Agent, or Firm* — Ming Chow; Sinorica, LLC (57) ABSTRACT A joint structure has a first main body, a positioning pin, a second main body, and a controlling button. The first main body forms with an annular wall and a limiting groove, and the annular wall forms an engaging passage. The positioning pin is mounted in the first main body. The second main body has a limiting protrusion and is rotatably mounted on the first main body; the limiting protrusion is mounted on the limiting groove. The controlling button is mounted on the second main body and forms a positioning groove and an engaging block corresponding to the engaging passage. The positioning pin can abut the positioning groove. With the cooperation of the positioning groove and the positioning pin, the joint structure can be folded or unfolded easily.

12 Claims, 11 Drawing Sheets

(51) Int. Cl.
*F16C 11/10* (2006.01)
*E04H 15/60* (2006.01)

(58) Field of Classification Search
CPC . Y10T 403/32401; E04H 15/48; E04H 15/60; F16C 11/045; F16C 11/10
USPC ...... 403/84, 91–96, 98–101; 182/22, 24, 27, 182/163; 135/131
See application file for complete search history.

(56) References Cited

U.S. PATENT DOCUMENTS

| | | | |
|---|---|---|---|
| 5,265,969 A | | 11/1993 | Chuang |
| 5,353,892 A | * | 10/1994 | Lu .............................. E06C 1/32 16/328 |
| 5,542,151 A | * | 8/1996 | Stranski ............... A47D 13/063 16/326 |
| 5,620,272 A | | 4/1997 | Sheng |
| 5,845,925 A | * | 12/1998 | Huang .................... B62B 7/083 280/642 |
| 5,992,566 A | * | 11/1999 | Yeh .......................... E06C 1/32 16/329 |
| 6,776,179 B1 | | 8/2004 | Chen |
| 7,047,597 B2 | * | 5/2006 | Lee .......................... E06C 1/32 16/233 |
| 9,580,959 B2 | * | 2/2017 | Kieffer .................... E06C 1/383 |
| 2003/0062219 A1 | * | 4/2003 | Yeh .......................... E06C 1/32 182/163 |
| 2011/0079261 A1 | | 4/2011 | Chen |
| 2012/0104808 A1 | | 5/2012 | Sellers et al. |
| 2014/0054938 A1 | | 2/2014 | Shan |
| 2014/0137913 A1 | | 5/2014 | Jin |
| 2017/0138085 A1 | * | 5/2017 | Kim ........................ E04H 15/48 |

* cited by examiner

JOINT STRUCTURE

CROSS-REFERENCE TO RELATED APPLICATIONS

This application is based upon and claims priority under 35 U.S.C. 119 from Taiwan patent Application No. 105123642 filed on Jul. 26, 2016, which is hereby specifically incorporated herein by this reference thereto.

BACKGROUND OF THE INVENTION

1. Field of the Invention

The present invention relates to a connecting component, especially to a joint structure for pitching or folding a tent.

2. Description of the Prior Arts

Tents are necessary equipment for camping and outdoor activities. As tents are of low weight and can be pitched or unpitched any time to provide a temporary shelter from sun and rain, tents are widely used by people engaged in outdoor activities.

Figure 10:
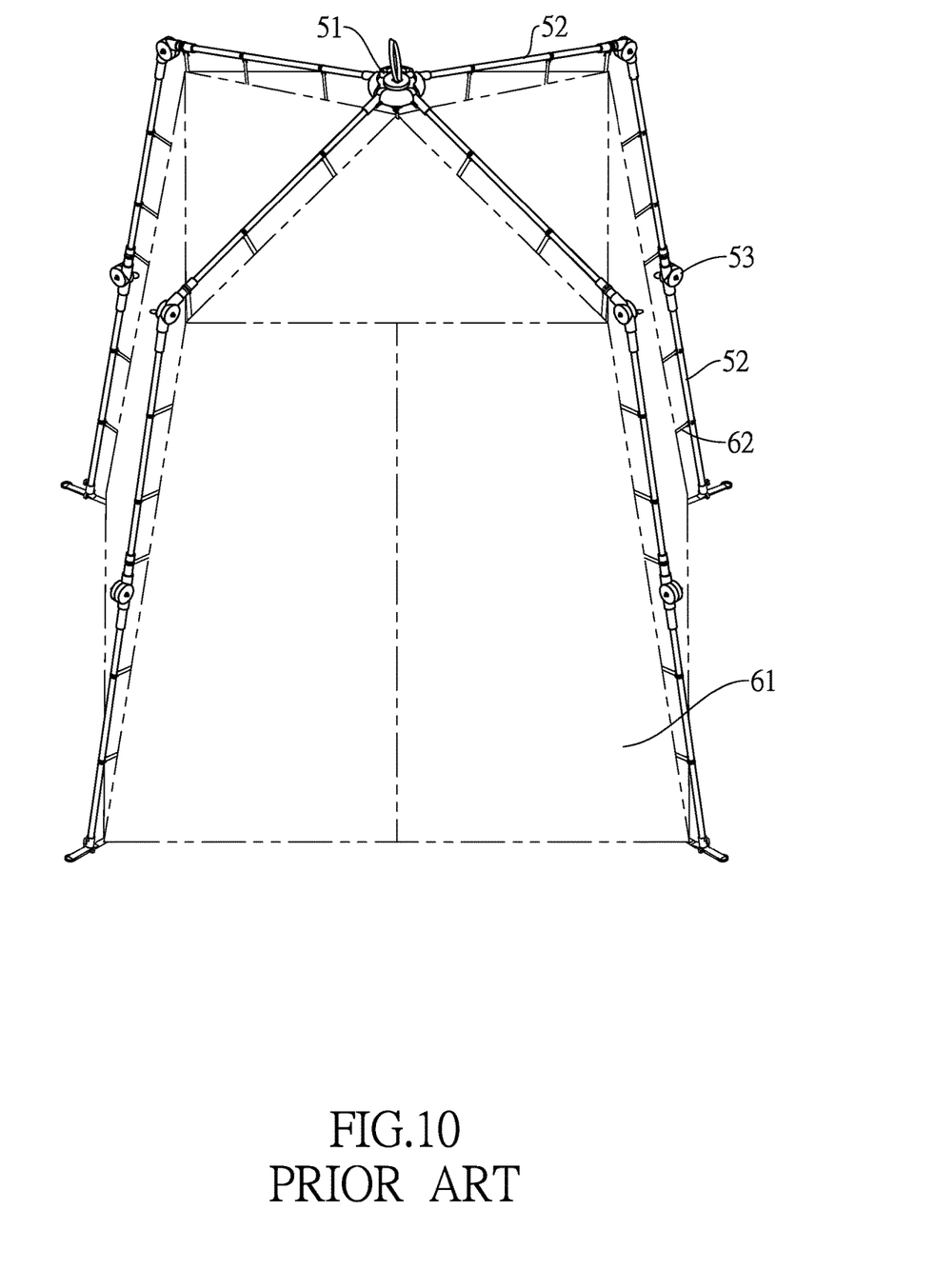
FIG. 10 is a perspective view of a conventional joint.

A tent is pitched through assembling tent rods, and the tent rods are connected by joints. FIG. 10 shows a rod joint of a tent rod of the conventional tent, e.g. Taiwan Utility Model Patent No. 570087. When the tent is pitched, a top seat 51 is radially installed with four branch rods 52. Each one of the four branch rods 52 is mounted with two other branch rods 52 for supporting the tent, and the two branch rods 52 are connected by joints 53 so that the two branch rods 52 are pivotable with respect to each other. Then a tent cloth 61 is fixed on the branch rods 52 through a plurality of elastic elements 62 and thereby the tent is constructed.

Figure 11:
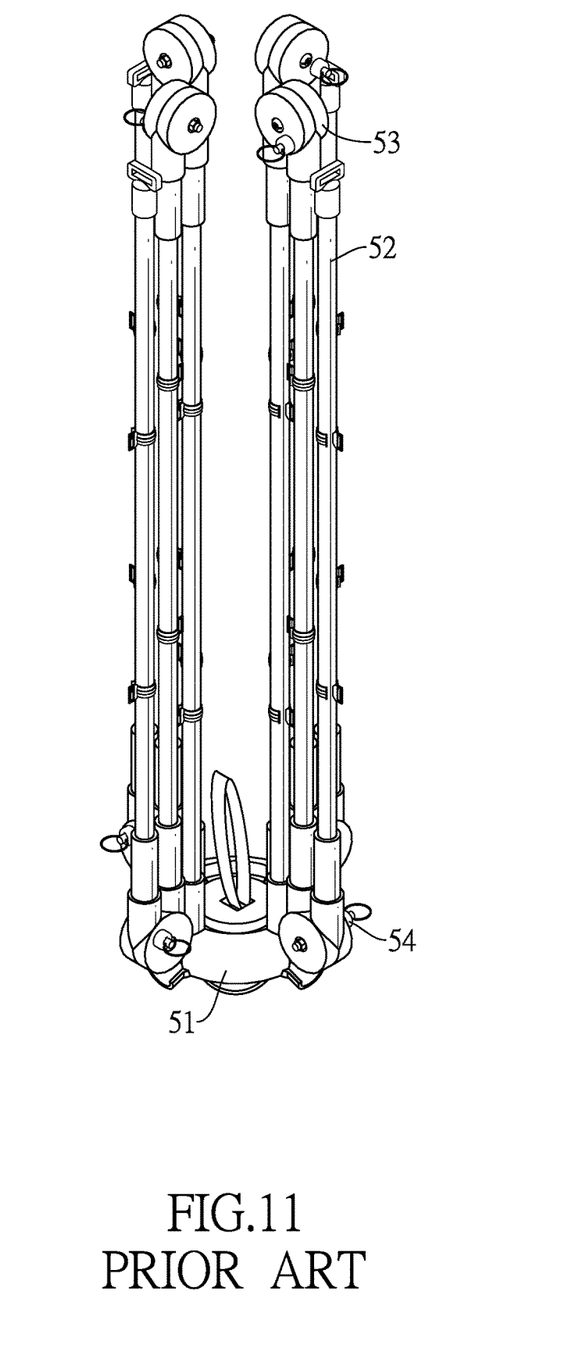
FIG. 11 is a perspective view of the conventional joint folded.

When the tent is folded, as shown in FIG. 11, after the tent cloth 61 and the elastic elements 62 are removed, a user can operate securing pins 54 and make the branch rods 52 pivotable about the joints 53, which causes each one of the branch rods 52 to fold toward each other, and a frame of the tent is folded completely. On the other hand, when the tent is unfolded, after the branch rods 52 are extended, the branch rods 52 are secured by the securing pins 54.

However, the securing pins 54 of the conventional rod joint have to be pulled out before the branch rods are pivoted. Besides, the securing pins 54 have to be rotated for a specific angle, which makes the securing pins 54 separate from the constraint of the joint 53, so that the joint can be pivoted and the branch rods 52 can be folded or unfolded for pitching or unpitching the tent. Because the connection of the securing pins 54 and the joints 53 is complicated, the process of pitching or unpitching the tent requires skill and experience. Besides, as the whole tent includes a lot of joints 53 on the tent rods, the securing pins 54 are preferably handled by several experienced people at the same time so that the tent rods can be folded or unfolded synchronously. Therefore, pitching or unpitching the tent is not an easy task.

To overcome the shortcomings, the present invention provides a joint structure to mitigate or obviate the aforementioned problems.

SUMMARY OF THE INVENTION

The main objective of the present invention is to provide a joint structure that obviates defects of the conventional joint that the conventional joint needs several experienced people to pitch or unpitch a tent together because the process is complicated. With the present joint structure, tent rods can be folded or unfolded easily and the process is simplified so that any one can pitch or unpitch a tent independently.

The joint structure has:
a first assembly comprising:
  a first main body comprising:
    an installing portion formed at a center of a lateral surface of the first main body;
    an annular wall protruding from the lateral surface of the first main body, the annular wall spaced apart from the installing portion;
    an engaging passage formed on the annular wall and communicating with two opposite surfaces of the annular wall; and
    a limiting groove concavely formed on the lateral surface of the first main body, surrounding the annular wall, and communicating with the engaging passage; and
  a positioning pin movably mounted in the first main body and selectively extending out of the lateral surface of the first main body that forms the installing portion;
a second assembly pivotably mounted on the first assembly and comprising:
  a second main body comprising:
    an installing base formed at a center of a lateral surface of the second main body and the installing base mounted on an outer surface of the installing portion of the first main body and in the annular wall; and
    a limiting protrusion protruding from the lateral surface of the second main body, curvedly surrounding the installing base, and mounted in the limiting groove of the first main body;
  a controlling button movably mounted between the first assembly and the second assembly and protruding out of the second main body, the controlling button being an elongated body and comprising:
    a positioning groove concavely formed on a side surface of the controlling button, the positioning pin of the first main body selectively abutting a bottom of the positioning groove or the side surface of the controlling button that forms the positioning groove;
    an engaging block protruding from the side surface of the controlling button that forms the positioning groove and selectively located in the engaging passage of the first main body, the engaging block surrounding the installing base of the second main body along with the annular wall; and
    a through hole formed through the controlling button and mounted around the installing base, the through hole extending along a lengthwise direction of the controlling button.

With the engaging block of the controlling button opposite the annular wall of the first main body and the engaging passage, the joint structure is in a secured using state. The first assembly and the second assembly form support components for pitching the tent. Besides, with the cooperation of the controlling button and positioning pin, the user can just press the controlling button and turn the first assembly, the present joint structure can be folded or unfolded easily and thereby the process of pitching or unpitching a tent is simplified so that any one can accomplish the task independently.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
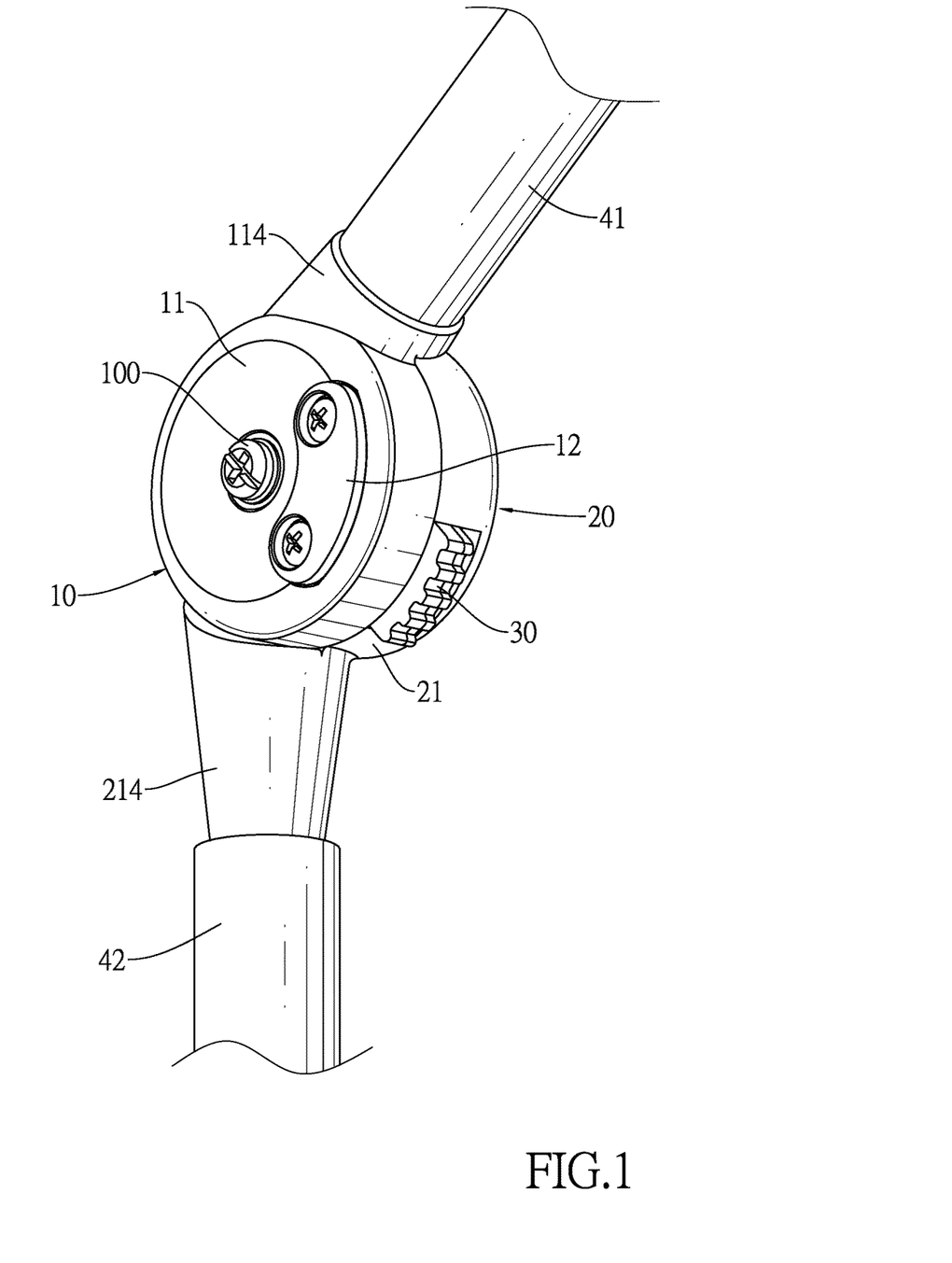
FIG. 1 is a perspective view of a joint structure in accordance with the present invention.

With reference to FIG. 1, a joint structure in accordance with the present invention comprises a first assembly 10, a second assembly 20, and a controlling button 30.

Figure 2:
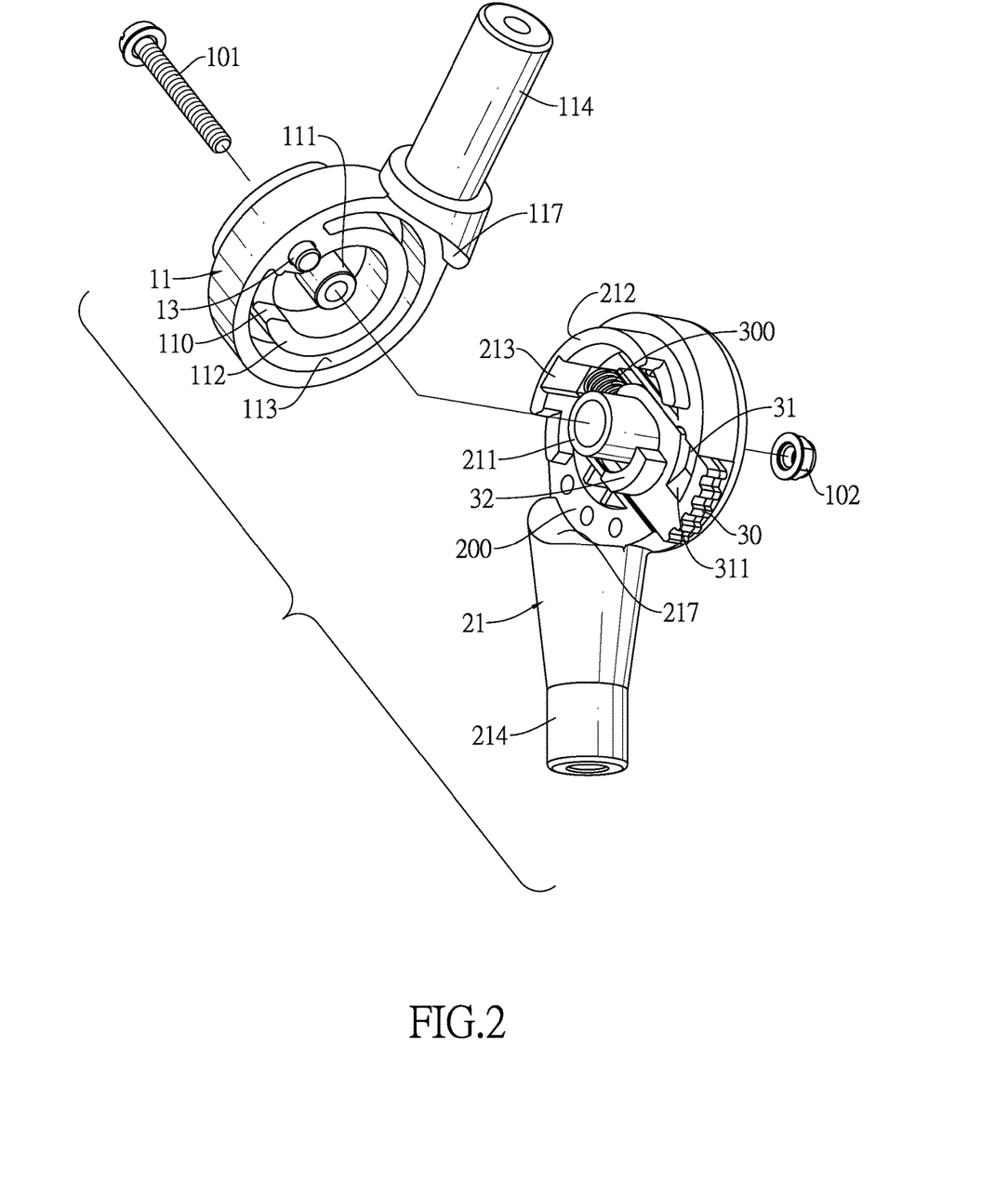
FIG. 2 is an exploded perspective view of the joint structure in FIG. 1.
Figure 3:
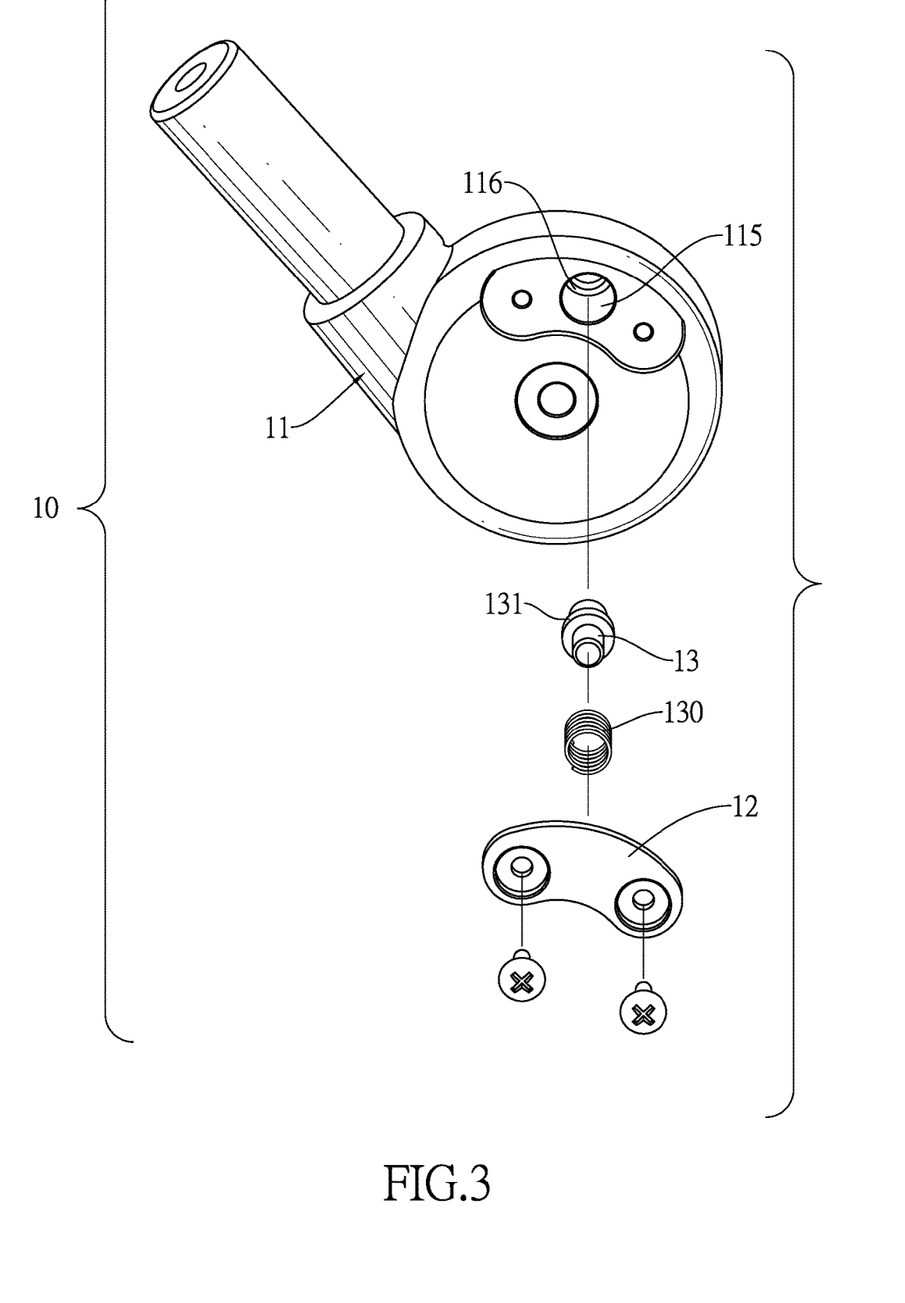
FIG. 3 is an exploded perspective view of a first assembly of the joint structure in FIG. 1.

With reference to FIGS. 1 to 3, the first assembly 10 comprises a first main body 11, a fixing body 12, a positioning pin 13, and an assembling component 100.

The first main body 11 comprises an installing portion 111, an annular wall 112, a limiting groove 113, a first joining portion 114, an installing hole 115, an engaging portion 116, a first abutting surface 117, and an engaging passage 110.

The installing portion 111 is formed at a center of a lateral surface of the first main body 11; the assembling component 100 is mounted on the installing portion 111.

The annular wall 112 protrudes from the lateral surface of the first main body 11 and along an outer surface of the installing portion 111, and the annular wall 112 is spaced apart from the installing portion 111.

The limiting groove 113 is concavely formed on the lateral surface of the first main body and surrounds the annular wall 112.

The first joining portion 114 protrudes from an outer surface of the first main body 11.

The installing hole 115 is formed through the first main body 11; the engaging portion 116 annularly protrudes from an inner surface of the installing hole 115.

The first abutting surface 117 is formed on a lateral surface of the first joining portion 114 that faces the first main body 11.

The engaging passage 110 is formed on the annular wall 112 and communicates with an inner edge of the annular wall 112 and the limiting groove 113.

The fixing body 12 is removably mounted on another lateral surface of the first main body 11 and covers the installing hole 115.

The positioning pin 13 is movably mounted in the first main body 11, and selectively extends out of the lateral surface of the first main body 11 that forms the installing portion 111. The positioning pin 13 comprises an annular protrusion 131 and a pressing component 130. Precisely, the positioning pin 13 is mounted in the installing hole 115.

The annular protrusion 131 annularly protrudes from an outer surface of the positioning pin 13 and is capable of abutting the engaging portion 116.

The pressing component 130 is mounted on the positioning pin 13. One end of the pressing component 130 abuts the annular protrusion 131, and the other end of the pressing component 130 abuts the fixing body 12. In this embodiment, the pressing component 130 is a resilient component, e.g. a spring.

In this embodiment, the assembling component 100 comprises a screw 101 and a nut 102.

Figure 4:
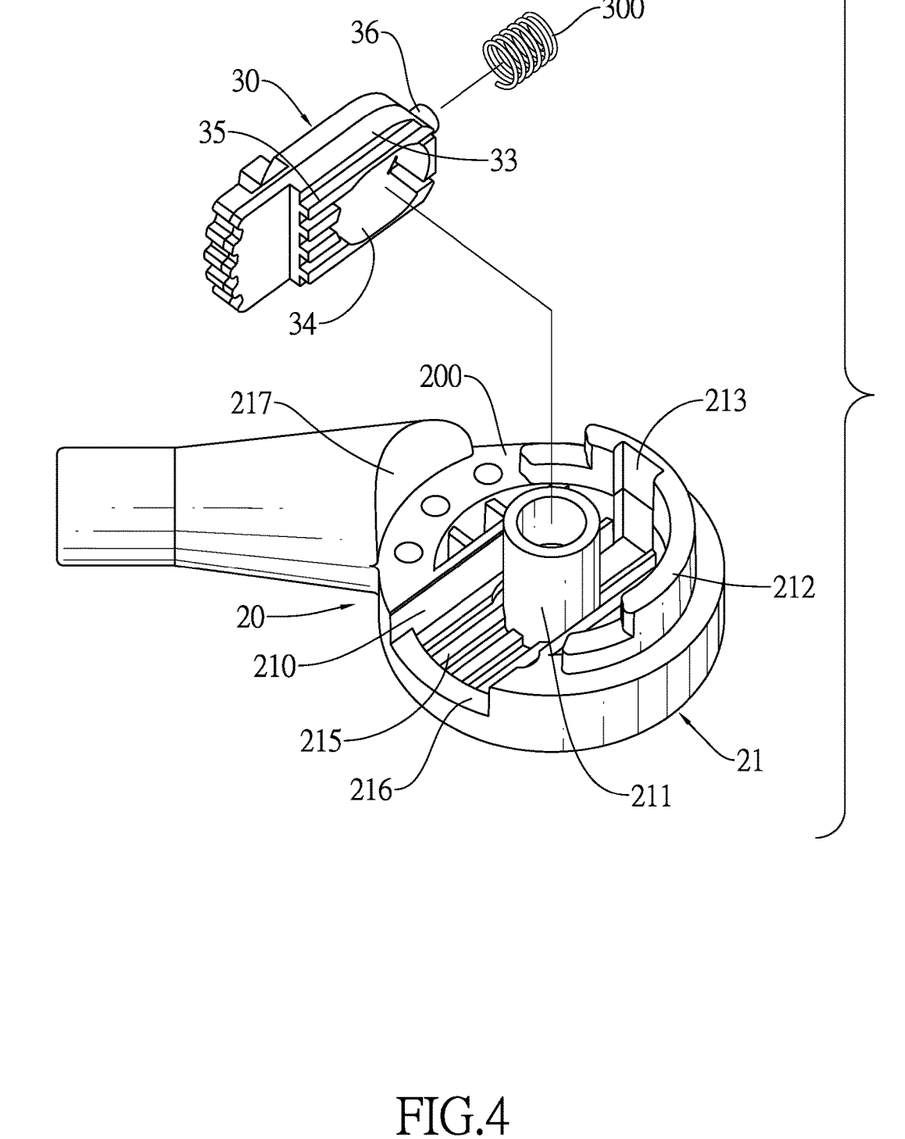
FIG. 4 is an exploded perspective view of a second assembly and a controlling button of the joint structure in FIG. 1.

With reference to FIGS. 1, 2, and 4, the second assembly 20 is pivotally mounted on the first assembly 10 through the assembling component 100, and the second assembly 20 comprises a second main body 21.

The second main body 21 comprises a connecting surface 200, a combining base 210, an installing base 211, a limiting protrusion 212, an installing notch 213, a second joining portion 214, a plurality of sliding grooves 215, and an opening slot 216.

The connecting surface 200 is formed on a lateral surface of the second main body 21, abuts the lateral surface of the first main body 11 that forms the installing portion 111, and is capable of abutting the positioning pin 13.

The combining base 210 is concavely formed on the connecting surface 200.

The installing base 211 protrudes from a center of a bottom surface of the combining base 210 and is mounted on the outer surface of the installing portion 111 of the first main body 11 and in the annular wall 112. The assembling component 100 is mounted through the installing portion 111 and the installing base 211. Precisely, the screw 101 of the assembling component 100 is mounted through the installing portion 111 and the installing base 211. The nut 102 of the assembling component 100 is mounted on the screw 101 and abuts the second main body 21.

The limiting protrusion 212 protrudes from the connecting surface 200 and curvedly surrounds the installing base 211; the limiting protrusion 212 is mounted in the limiting groove 113.

The installing notch 213 is concavely formed on an inner surface of the limiting protrusion 212 and extends along a thickness direction of the second main body 21.

The second joining portion 214 protrudes from an outer surface of the second main body 21.

The plurality of sliding grooves 215 are spaced apart from each other, are concavely formed in the bottom surface of the combining base 210, and are adjacent to the installing base 211.

The opening slot 216 is formed on an edge of the connecting surface 200 and communicates with an inside of the combining base 210 and the outer surface of the second main body 21; the outer surface of the second main body 21 abuts the first abutting surface 117 of the first main body 11, and the opening slot 216 can be covered by the first abutting surface 117.

The second abutting surface 217 is formed on a lateral surface of the second joining portion 214 that faces the second main body 21 and abuts the outer surface of the first main body 11.

Figure 5:
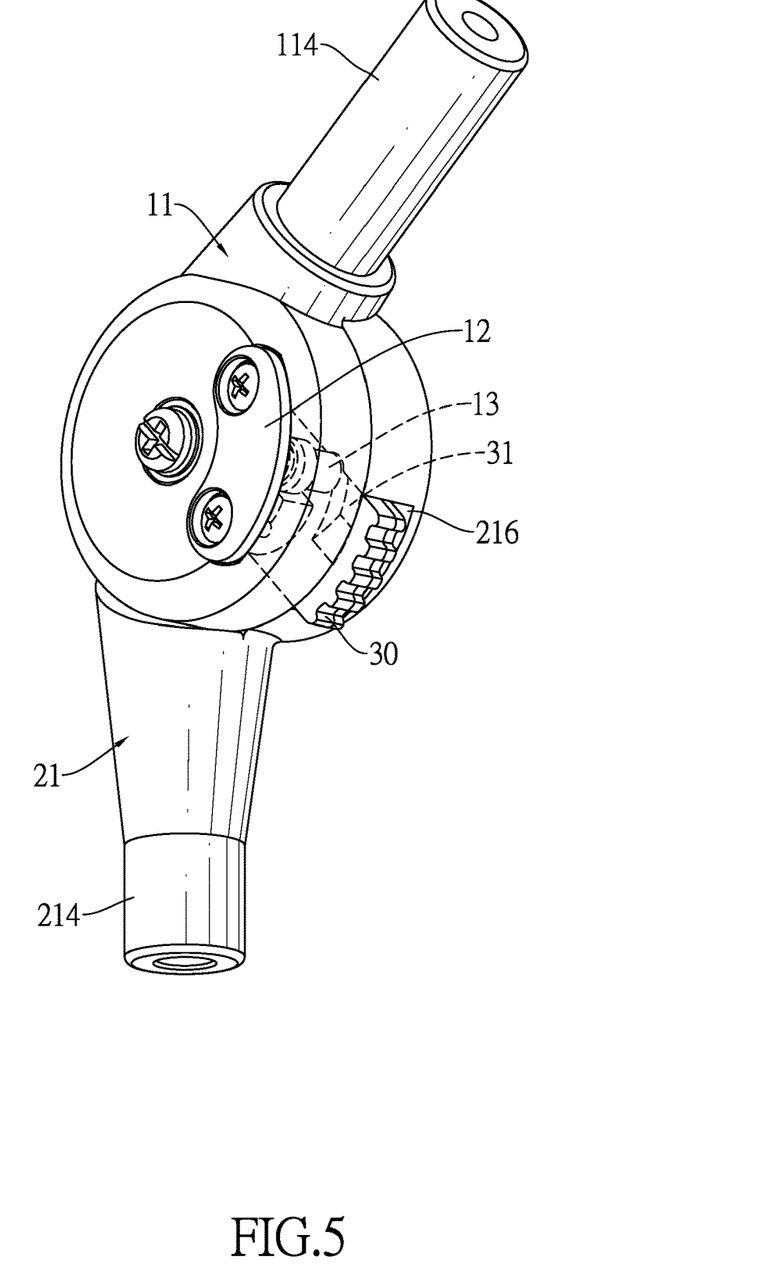
FIG. 5 is a perspective view of a first state of the joint structure in FIG. 1.

With reference to FIGS. 2, 4, and 5, the controlling button 30 is movably mounted between the first assembly 10 and the second assembly 20 and protrudes out of the second main body 21 of the second assembly 20. The controlling button 30 is an elongated body and comprises a positioning groove 31, an engaging block 32, a combining portion 33, a through hole 34, a plurality of sliding strips 35, an installing block 36, and a location reinstating component 300.

The positioning groove 31 is concavely formed on a side surface of the controlling button 30; the positioning pin 13 of the first main body 11 selectively abuts a bottom of the positioning groove 31 or the side surface of the controlling button 30 that forms the positioning groove 31.

The positioning groove 31 further comprises a guiding portion 311 connecting with the bottom of the positioning groove 31 and the side surface of the controlling button 30 that forms the positioning groove 31. Precisely, the guiding portion 311 is an inclined plane so that the positioning pin 13 can easily move between the positioning groove 31 and the side surface of the controlling button 30.

The engaging block 32 protrudes from the side surface of the controlling button 30 that forms the positioning groove 31; the engaging block 32 is selectively located in the engaging passage 110 of the first main body 11 and surrounds the installing base 211 of the second main body 21 with the annular wall 112.

The through hole 34 is formed through the controlling button 30 along a lengthwise direction of the controlling button 30 and is mounted around the installing base 211.

The combining portion 33 protrudes from another side surface of the controlling button 30; the through hole 34 is formed through the combining portion 33, and the combining portion 33 is mounted in the combining base 210 of the second main body 21.

The plurality of sliding strips 35 are spaced apart from each other and concavely formed on the combining portion 33 along the lengthwise direction of the controlling button 30; the plurality of sliding strips 35 are mounted in the sliding grooves 215 of the second main body 21.

The installing block 36 protrudes from an end of the controlling button 30 and is mounted in the installing notch 213 of the second main body 21.

The location reinstating component 300 is mounted around the installing block 36, two ends of the location reinstating component 300 respectively abut the controlling button 30 and a bottom of the installing notch 213. In this embodiment, the location reinstating component 300 is a spring. The location reinstating component 300 abuts the controlling button 30 so that the controlling button 30 is mounted through the opening slot 216 of the second main body 21 and protrudes out of the second main body 21.

During a process of pitching a tent, the present invention should be assembled between two adjacent tent rods as shown in FIG. 1. At this time, the first assembly 10 and the second assembly 20 are in a first state. In other words, the first joining portion 114 of the first main body 11 and the second joining portion 214 of the second main body 21 are distal from each other. One tent rod 41 is mounted on the first joining portion 114 of the first main body 11, and another tent rod 42 is mounted on the second joining portion 214 of the second main body 21. Through the aforesaid mounting process, each component of the tent is assembled.

Figure 6:
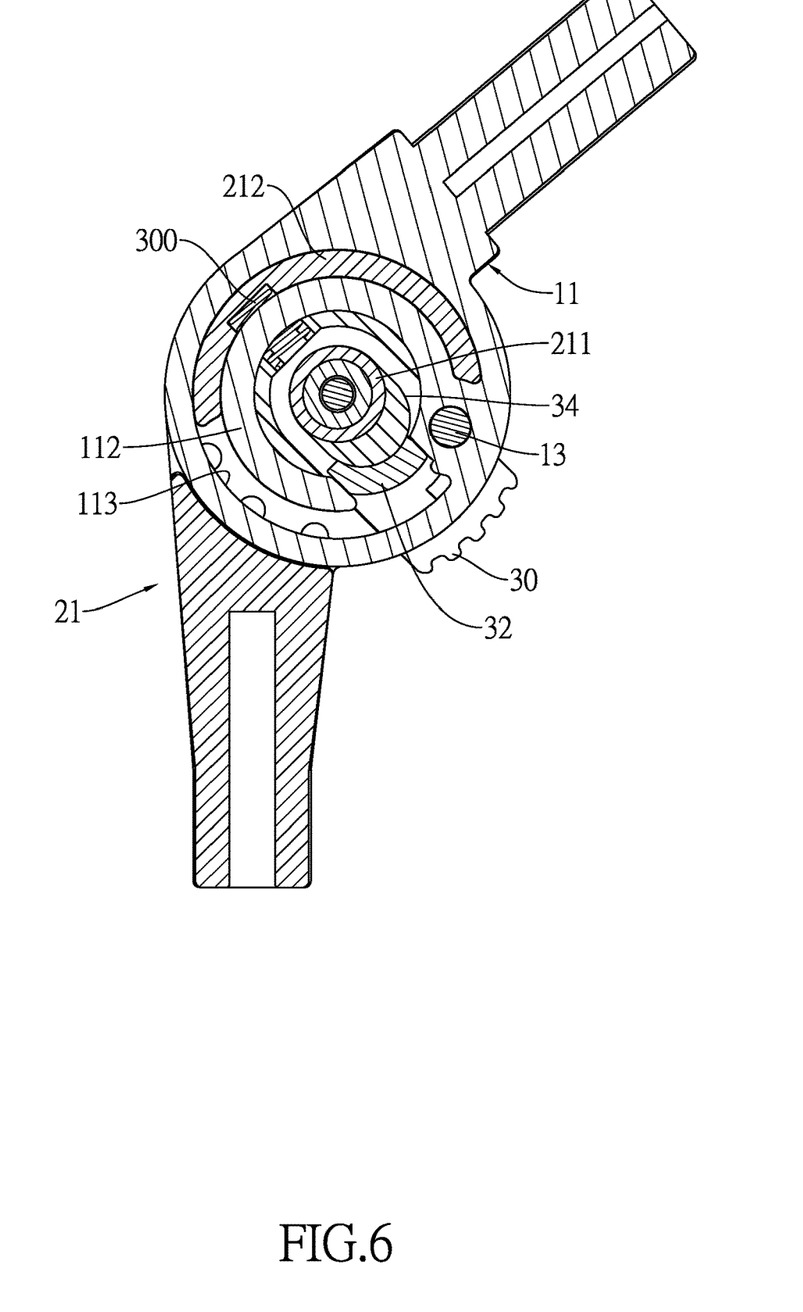
FIG. 6 is a sectional view of the first state of the joint structure in FIG. 1.

When the tent is in use, in accordance with FIGS. 2, 5, and 6, one end of the limiting protrusion 212 of the second main body 21 abuts an end of an inner surface of the limiting groove 113. With the location reinstating component 300, the controlling button 30 is mounted through the opening slot 216 and protrudes out of the second main body 21. The positioning pin 13 abuts the side surface of the controlling button 30 that forms the positioning groove 31, an inner surface of the through hole 34 abuts an outer surface of the installing base 211, and the engaging block 32 is located in the engaging passage 110 so that the first main body 11 cannot pivot with respect to the second main body 21. In other words, the present invention is fixed in the first state and cannot be folded.

Figure 7:
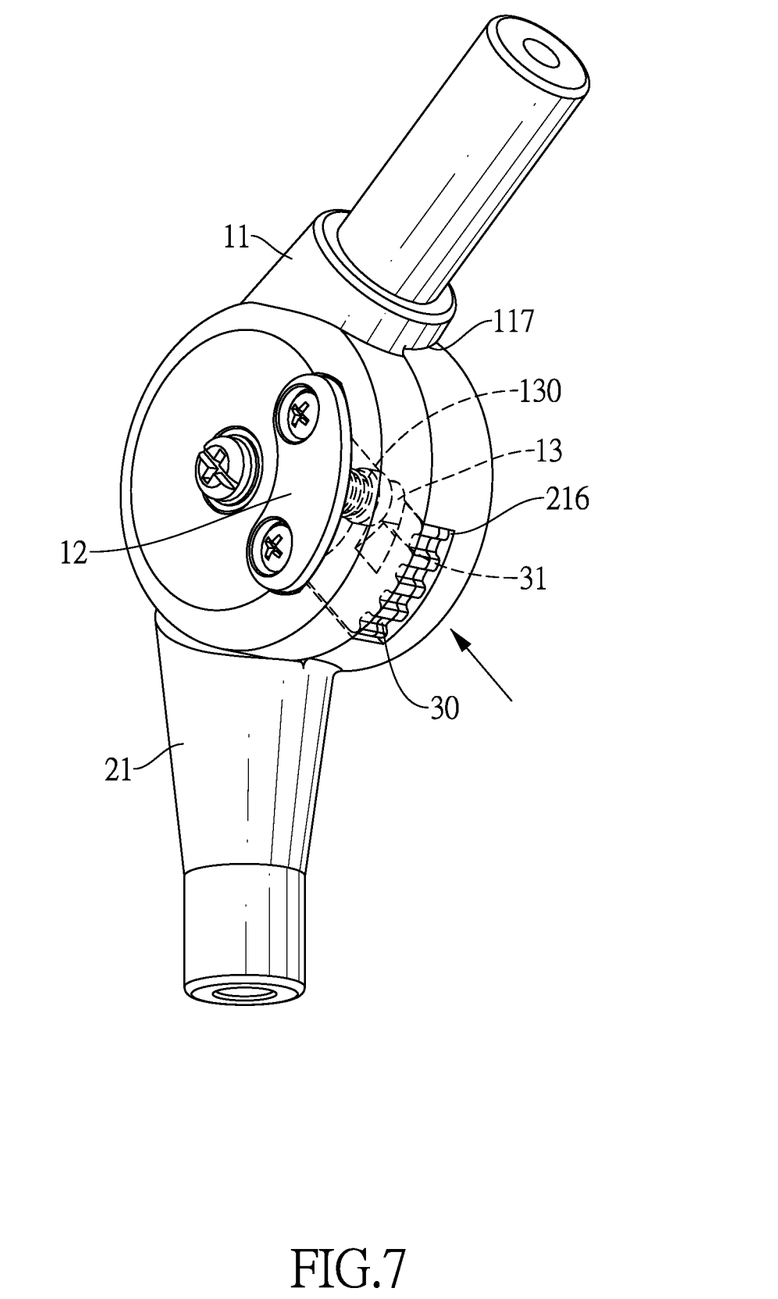
FIG. 7 is a perspective view of a second state of the joint structure in FIG. 1.

When the present invention is in a second state, in accordance with FIGS. 3, 4, and 7, before unpitching the tent, user should press the controlling button 30 first to counteract to a resilient force of the location reinstating component 300, which makes the controlling button 30 move toward the installing base 211. At the same time, the pressing component 130 abuts on the positioning pin 13, which makes the positioning pin 13 move toward the controlling button 30. Because of the movement of the controlling button 30, the positioning pin 13 moves into the positioning groove 31 and engages with the controlling button 30 so that the location reinstating component 300 is kept in a compressed state and the controlling button 30 temporarily cannot protrude from the second main body 21. In other words, one user can independently complete the unpitching process of the tent through pressing all of the controlling buttons 30.

Figure 8:
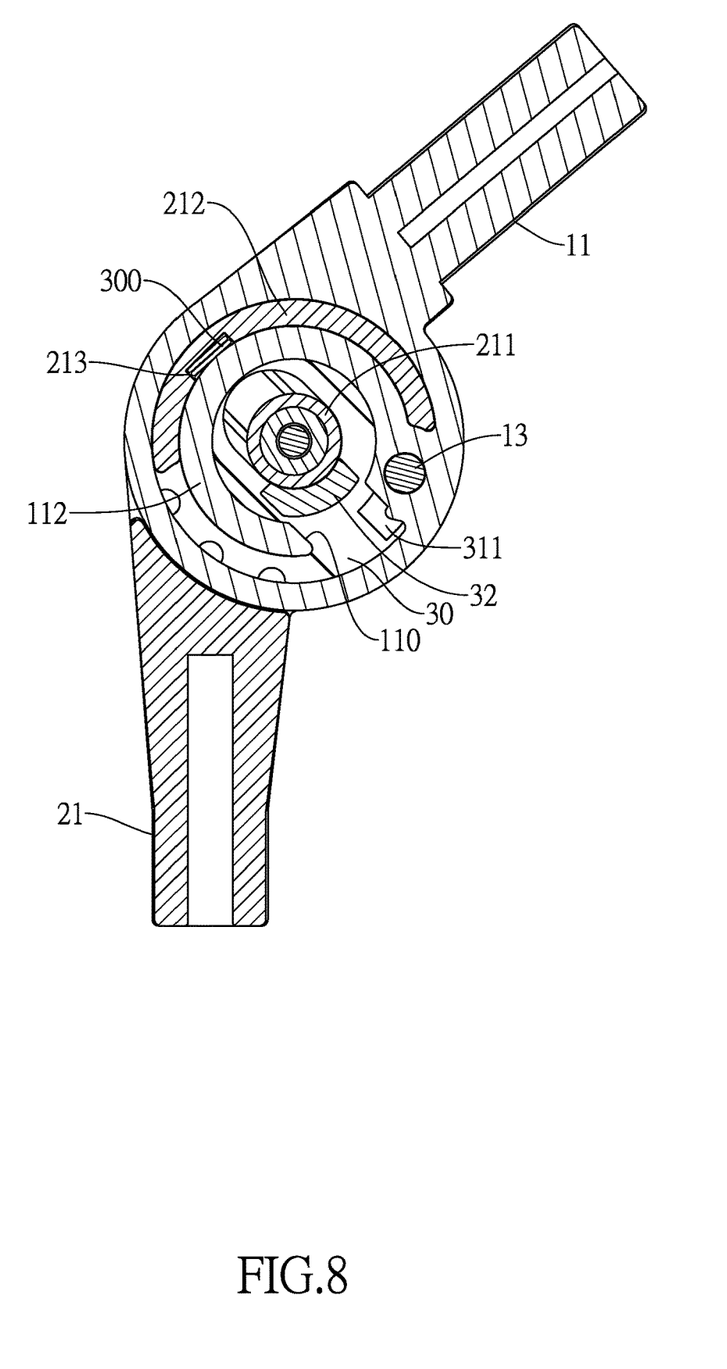
FIG. 8 is a sectional view of the second state of the joint structure in FIG. 1.
Figure 9:
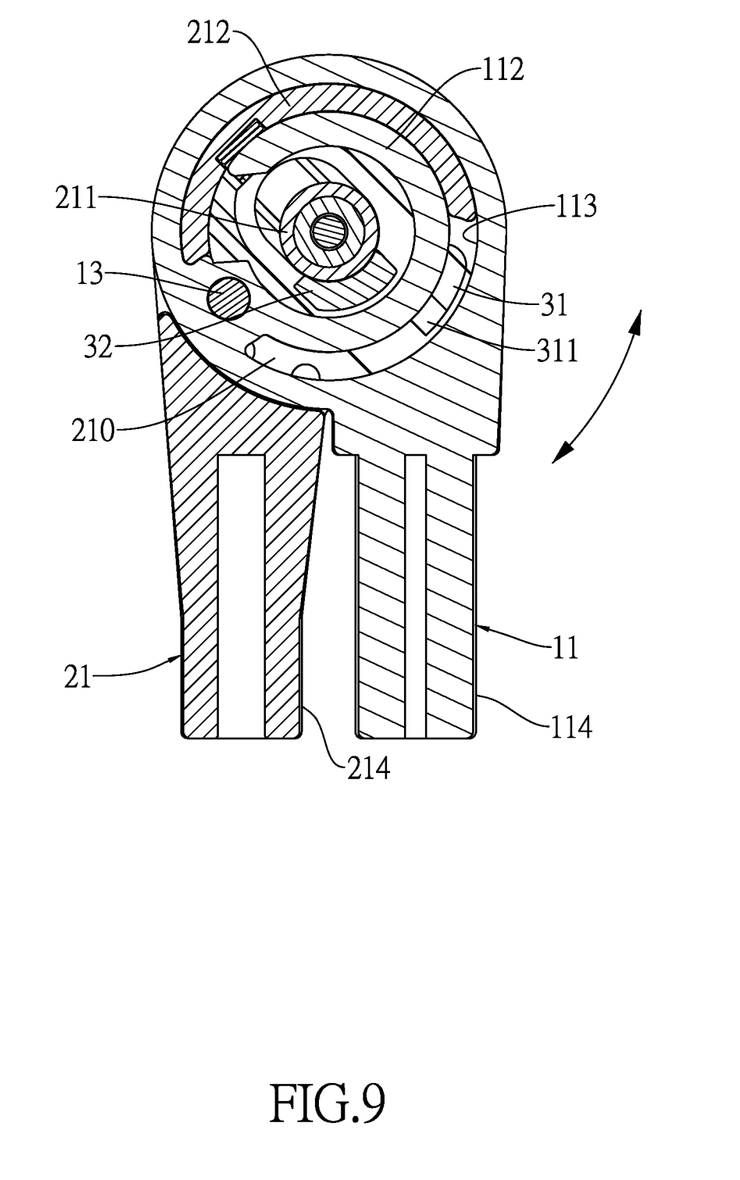
FIG. 9 is a sectional view of the second state after folding of the joint structure in FIG. 1.

Then also refer to FIGS. 7, 8, and 9. In the second state, after the controlling button 30 is pressed, the engaging block 32 moves toward the installing base 211 and separates from the engaging passage 110, which makes the first main body 11 and the second main body 21 also separate from each other and become rotatable. Then, the user turns the first main body 11, which causes the first joining portion 114 to rotate toward the second joining portion 214 and the other end of the limiting protrusion 212 to abut on the other end of the limiting groove 113. During the rotation of the first main body 11, the positioning pin 13 moves from the bottom of the positioning groove 31 to the fixing body 12, which compresses the pressing component 130. Precisely, the positioning pin 13 moves along the guiding portion 311 and sequentially passes the bottom of the positioning groove 31 and a lateral surface of the controlling button 30, until the positioning pin 13 abuts the connecting surface 200.

At the same time, the other end of the limiting protrusion 212 abuts on the other end of the limiting groove 113, the engaging block 32 is restricted between the inner edge of the annular wall 112 and the installing base 211, and the first abutting surface 117 covers the opening slot 216 so that the controlling button 30 cannot protrude out of the second main body 21. Thus, the tent is unpitched completely.

On the contrary, when unfolding the present joint structure and pitching the tent, the user can just turn the first main body 11 in an opposite direction, which causes the first joining portion 114 to separate from the second joining portion 214, so that the positioning pin 13 rotates along with the first main body 11, and moves along the connecting surface 200 toward the side surface of the controlling button 30 that forms the positioning groove 31. Meanwhile, the controlling button 30 protrudes out of the second main body 21 by abutment of the location reinstating component 300. Thus, the positioning pin 13 will not move into the positioning groove 31, and the engaging block 32 will be located in the engaging passage 110, which prevents the present invention from switching to be rotatable as in the first state.

The user can just press the controlling button 30 to make the controlling button 30 move into the second main body 21 and the positioning pin 13 abut on the positioning groove 31. Thus the pressed joint structure is in a temporarily secure state and allows one user to independently press each controlling button 30 of the present joint structures of the tent. After each of the controlling buttons 30 of the present joint structures is pressed, because the engaging block 32 is separated from the engaging passage 110, the present joint structure can be folded and the tent can be unpitched when the first main body 11 is rotated, which causes the engaging block 32 to be located on the inner edge of the annular wall 112. Conversely, when pitching the tent, the user can rotate the first main body 11 to unfold the present joint structure. As the engaging block 32 is located in the engaging passage 110, the present joint structure is in a secured using state and becomes a support component of the tent. Therefore, the process of pitching or unpitching a tent is simplified so that one user can independently pitch or unpitch a tent.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A joint structure comprising:
   a first assembly comprising:
      a first main body comprising:
         an installing portion formed at a center of a lateral surface of the first main body;
         an annular wall protruding from the lateral surface of the first main body, the annular wall spaced apart from the installing portion;
         an engaging passage formed on the annular wall and communicating with two opposite surfaces of the annular wall; and
         a limiting groove concavely formed on the lateral surface of the first main body, surrounding the annular wall, and communicating with the engaging passage; and
      a positioning pin movably mounted in the first main body and selectively extending out of the lateral surface of the first main body that forms the installing portion;
   a second assembly pivotably mounted on the first assembly and comprising:
      a second main body comprising:
         an installing base formed at a center of a lateral surface of the second main body and the installing base mounted on an outer surface of the installing portion of the first main body and in the annular wall;
         a limiting protrusion protruding from the lateral surface of the second main body, curvedly surrounding the installing base, and mounted in the limiting groove of the first main body;
         a connecting surface formed on the lateral surface of the second main body that forms the installing base, abutting the lateral surface of the first main body that forms the installing portion, and capable of abutting the positioning pin, said limiting protrusion formed on the connecting surface;
         a combining base concavely formed on the connecting surface, said installing base protruding from a bottom surface of the combining base;
         a plurality of sliding grooves spaced apart from each other, concavely formed in the bottom surface of the combining base, and adjacent to the installing base; and
         an opening slot concavely formed on an edge of the connecting surface and communicating with an inside of the combining base and an outer surface of the second main body;
      a controlling button movably mounted between the first assembly and the second assembly, mounted through the opening slot of the second main body, and protruding out of the second main body, the controlling button being an elongated body and comprising:
         a positioning groove concavely formed on a side surface of the controlling button, the positioning pin of the first main body selectively abutting a bottom of the positioning groove or the side surface of the controlling button that forms the positioning groove;
         an engaging block protruding from the side surface of the controlling button that forms the positioning groove and selectively located in the engaging passage of the first main body, the engaging block surrounding the installing base of the second main body along with the annular wall;
         a through hole formed through the controlling button and mounted around the installing base, the through hole extending along a lengthwise direction of the controlling button;
         a combining portion protruding from another side surface of the controlling button, the through hole formed through the combining portion, the combining portion mounted in the combining base of the second main body; and
         a plurality of sliding strips spaced apart from each other and concavely formed on the combining portion along the lengthwise direction of the controlling button, the sliding strips mounted in the sliding grooves of the second main body.

2. The joint structure as claimed in claim 1, wherein:
   the second main body further comprises
      an installing notch concavely formed on the inner surface of the limiting protrusion and extending along a thickness direction of the second main body; and
   the controlling button further comprises:
      an installing block protruding from an end of the controlling button and mounted in the installing notch of the second main body; and
      a location reinstating component mounted around the installing block, two ends of the location reinstating component respectively abutting the controlling button and a bottom of the installing notch.

3. The joint structure as claimed in claim 2, wherein:
   the first main body further comprises:
      an installing hole formed through the first main body; and
      an engaging portion annularly protruding from an inner surface of the installing hole;
   the positioning pin is mounted in the installing hole and comprises:
      an annular protrusion annularly protruding from an outer surface of the positioning pin and capable of abutting the engaging portion; and
      a pressing component mounted on the positioning pin, one end of the pressing component abutting the annular protrusion; and
   the first assembly further comprises:
      a fixing body removably mounted on another lateral surface of the first main body and covering the installing hole, another end of the pressing component of the positioning pin abutting the fixing body; and an assembling component mounted through the installing portion of the first main body and the installing base of the second main body.

4. The joint structure as claimed in claim 3, wherein:
the first main body further comprises
   a first joining portion protruding from an outer surface of the first main body;
the second main body further comprises
   a second joining portion protruding from the outer surface of the second main body.

5. The joint structure as claimed in claim 4, wherein:
the first main body further comprises
   a first abutting surface formed on a lateral surface of the first joining portion that faces the first main body, abutting the outer surface of the second main body, and capable of covering the opening slot; and
the second main body further comprises
   a second abutting surface formed on a lateral surface of the second joining portion that faces the second main body and abuts the outer surface of the first main body.

6. The joint structure as claimed in claim 5, wherein the assembling component comprises:
   a screw mounted through the installing portion of the first main body and the installing base of the second main body; and
   a nut mounted on the screw and abutting the second main body.

7. The joint structure as claimed in claim 6, wherein the positioning groove of the controlling button further comprises:
   a guiding portion connecting with the bottom of the positioning groove and the side surface of the controlling button that forms the positioning groove.

8. The joint structure as claimed in claim 1, wherein:
the first main body further comprises:
   an installing hole formed through the first main body; and
   an engaging portion annularly protruding from an inner surface of the installing hole;
the positioning pin is mounted in the installing hole and comprises:
   an annular protrusion annularly protruding from an outer surface of the positioning pin and capable of abutting the engaging portion; and
   a pressing component mounted on the positioning pin, one end of the pressing component abutting the annular protrusion; and
the first assembly further comprises:
   a fixing body removably mounted on another lateral surface of the first main body and covering the installing hole, another end of the pressing component of the positioning pin abutting the fixing body; and
   an assembling component mounted through the installing portion of the first main body and the installing base of the second main body.

9. The joint structure as claimed in claim 8, wherein:
the first main body further comprises
   a first joining portion protruding from an outer surface of the first main body;
the second main body further comprises
   a second joining portion protruding from the outer surface of the second main body.

10. The joint structure as claimed in claim 9, wherein:
the first main body further comprises
   a first abutting surface formed on an lateral surface of the first joining portion that faces the first main body, abutting the outer surface of the second main body, and capable of covering the opening slot; and
the second main body further comprises
   a second abutting surface formed on a lateral surface of the second joining portion that faces the second main body and abuts the outer surface of the first main body.

11. The joint structure as claimed in claim 10, wherein the assembling component comprises:
   a screw mounted through the installing portion of the first main body and the installing base of the second main body; and
   a nut mounted on the screw and abutting the second main body.

12. The joint structure as claimed in claim 1, wherein the positioning groove of the controlling button further comprises:
   a guiding portion connecting with the bottom of the positioning groove and the side surface of the controlling button that forms the positioning groove.

\* \* \* \* \*